(12) United States Patent
Zhao et al.

(10) Patent No.: US 9,103,196 B2
(45) Date of Patent: Aug. 11, 2015

(54) PIPELINED PULSE-ECHO SCHEME FOR AN ACOUSTIC IMAGE TOOL FOR USE DOWNHOLE

(75) Inventors: Jinsong Zhao, Houston, TX (US); James V. Leggett, III, Magnolia, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 894 days.

(21) Appl. No.: 13/195,694

(22) Filed: Aug. 1, 2011

(65) Prior Publication Data

US 2012/0033528 A1 Feb. 9, 2012

Related U.S. Application Data

(60) Provisional application No. 61/370,359, filed on Aug. 3, 2010.

(51) Int. Cl.
*G01V 1/38* (2006.01)
*E21B 47/08* (2012.01)
*G01V 1/50* (2006.01)
*G01V 1/44* (2006.01)

(52) U.S. Cl.
CPC ............ *E21B 47/082* (2013.01); *G01V 1/44* (2013.01); *G01V 1/50* (2013.01)

(58) Field of Classification Search
USPC ...................................... 367/28, 35
See application file for complete search history.

(56) References Cited

U.S. PATENT DOCUMENTS

| 4,255,798 | A | | 3/1981 | Havira | |
|---|---|---|---|---|---|
| 4,780,858 | A | * | 10/1988 | Clerke | 367/35 |
| 4,867,264 | A | * | 9/1989 | Siegfried | 181/105 |
| 5,377,160 | A | | 12/1994 | Tello et al. | |
| 5,491,668 | A | * | 2/1996 | Priest | 367/35 |
| 5,638,337 | A | * | 6/1997 | Priest | 367/27 |
| 5,644,550 | A | | 7/1997 | Priest | |
| 7,311,143 | B2 | | 12/2007 | Engels et al. | |
| 7,548,817 | B2 | | 6/2009 | Hassan et al. | |
| 7,966,874 | B2 | | 6/2011 | Hassan et al. | |
| 8,015,868 | B2 | | 9/2011 | Hassan et al. | |
| 8,190,369 | B2 | | 5/2012 | Moos et al. | |
| 2005/0152219 | A1 | * | 7/2005 | Garcia-Osuna et al. | 367/25 |
| 2005/0205268 | A1 | * | 9/2005 | Engels et al. | 166/381 |
| 2006/0254767 | A1 | * | 11/2006 | Pabon et al. | 166/254.2 |

(Continued)

FOREIGN PATENT DOCUMENTS

EP    1348954 A1    10/2003

*Primary Examiner* — James Hulka

(74) *Attorney, Agent, or Firm* — Mossman Kumar & Tyler PC

(57) ABSTRACT

The present disclosure is related to apparatuses and methods for estimating borehole parameters using a plurality of reflections caused by a plurality of acoustic pulses. The reflections may overlap each other and/or the acoustic pulses. The methods may include estimating an envelope of the received acoustic signal at the at least one element of the array of transducers; and estimating at least one arrival time of at least one of the plurality of overlapping events from the envelope of the received acoustic signals, the arrival times being characteristic of the geometry of the borehole. The method may also include imaging the borehole wall. The apparatus may include an array of transducers on a rotatable transducer assembly with at least one element on the array configured to generate a plurality of acoustic pulses and receive reflections and a processor configured to perform the method.

20 Claims, 16 Drawing Sheets

(56) References Cited

U.S. PATENT DOCUMENTS

| | | |
|---|---|---|
| 2007/0005251 A1 | 1/2007 | Chemali et al. |
| 2007/0280048 A1* | 12/2007 | Dubinsky et al. ............... 367/31 |
| 2008/0307875 A1* | 12/2008 | Hassan et al. .............. 73/152.16 |
| 2009/0065252 A1* | 3/2009 | Moos et al. ..................... 175/50 |
| 2009/0084176 A1* | 4/2009 | Hassan et al. ............. 73/152.57 |
| 2009/0114472 A1 | 5/2009 | Winkler et al. |
| 2010/0118648 A1* | 5/2010 | Zhao ............................... 367/35 |
| 2010/0118649 A1 | 5/2010 | Zhao |
| 2010/0187008 A1 | 7/2010 | Wassermann et al. |
| 2011/0080803 A1* | 4/2011 | Vu et al. .......................... 367/32 |

\* cited by examiner

PIPELINED PULSE-ECHO SCHEME FOR AN ACOUSTIC IMAGE TOOL FOR USE DOWNHOLE

CROSS-REFERENCES TO RELATED APPLICATIONS

This application claims priority from U.S. Provisional Patent Application Ser. No. 61/370,359, filed on 3 Aug. 2010.

FIELD OF THE DISCLOSURE

The present disclosure is related to the field of servicing boreholes with electric wireline tools and Logging While Drilling (LWD) tools. More specifically, the present disclosure is related to the use of acoustic pulse-echo imaging tools, and processing data acquired with acoustic imaging tools to estimate parameters of the borehole and/or the earth formation.

BACKGROUND OF THE DISCLOSURE

Acoustic pulse-echo imaging tools are known in the art. The acoustic pulse-echo imaging tool usually comprises a rotating head on which is mounted a piezoelectric element transducer. The transducer periodically emits an acoustic energy pulse on command from a controller circuit in the tool. After emission of the acoustic energy pulse, the transducer can be connected to a receiving circuit, generally located in the tool, for measuring a returning echo of the previously emitted acoustic pulse which is reflected off the borehole wall. By processing the reflected signal, it is possible to infer something about the acoustic impedance characterizing the near-borehole environment. Specifically, changes in acoustic impedance are diagnostic of the geometry of the borehole.

Typically, as single acoustic pulse results in a plurality of reflections that may be received as a signal to be processed to estimate the arrival times and amplitudes with widely varying amplitudes and a highly reverberatory nature. The use of a single acoustic pulse and then waiting for a plurality of reflections requires considerable time and energy for evaluating the near-borehole environment. The present disclosure is directed towards apparatuses and methods for estimating parameters of the near-borehole environment using the arrival times and amplitudes of a plurality of reflections produced by a plurality of pulses, thus reducing the time and energy requirements.

SUMMARY OF THE DISCLOSURE

In aspects, the present disclosure generally relates to servicing boreholes with electric wireline tools and Logging While Drilling (LWD) tools. More specifically, the present disclosure is related to the use of acoustic pulse-echo imaging tools, and processing data acquired with acoustic imaging tools to estimate parameters of the borehole and/or the earth formation.

One embodiment according to the present disclosure may include an apparatus configured to estimate a geometry of a borehole penetrating an earth formation, the apparatus comprising: a rotatable transducer assembly; an array of transducers on the rotatable transducer assembly, at least one element of the array configured to: generate a plurality of acoustic pulses in the borehole, and receive an acoustic signal comprising a plurality of overlapping events resulting from the generation of the plurality of acoustic pulses; and at least one processor configured to: estimate an envelope of the received acoustic signal at the at least one element of the array of transducers; and estimate at least one arrival time of at least one of the plurality of overlapping events from the envelope of the received acoustic signals, the at least one arrival time being characteristic of the geometry of the borehole.

Another embodiment according to the present disclosure may include a method for estimating a geometry of a borehole penetrating an earth formation, comprising: estimating, using at least one processor, an envelope of an acoustic signal received by at least one element of an array of transducers, the acoustic signal comprising a plurality of overlapping events resulting from a plurality of acoustic pulses; and estimating the geometry of the borehole using at least one arrival time of at least one of the plurality of overlapping events from the envelope of the received acoustic signal.

Another embodiment according to the present disclosure may include a non-transitory computer-readable medium product having stored thereon instructions that, when executed by at least one processor, perform a method, the method comprising: estimating an envelope of an acoustic signal received by at least one element of an array of transducers, the acoustic signal comprising a plurality of overlapping events; and estimating a geometry of a borehole using at least one arrival time of at least one of the plurality of overlapping events from the envelope of the received acoustic signal.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
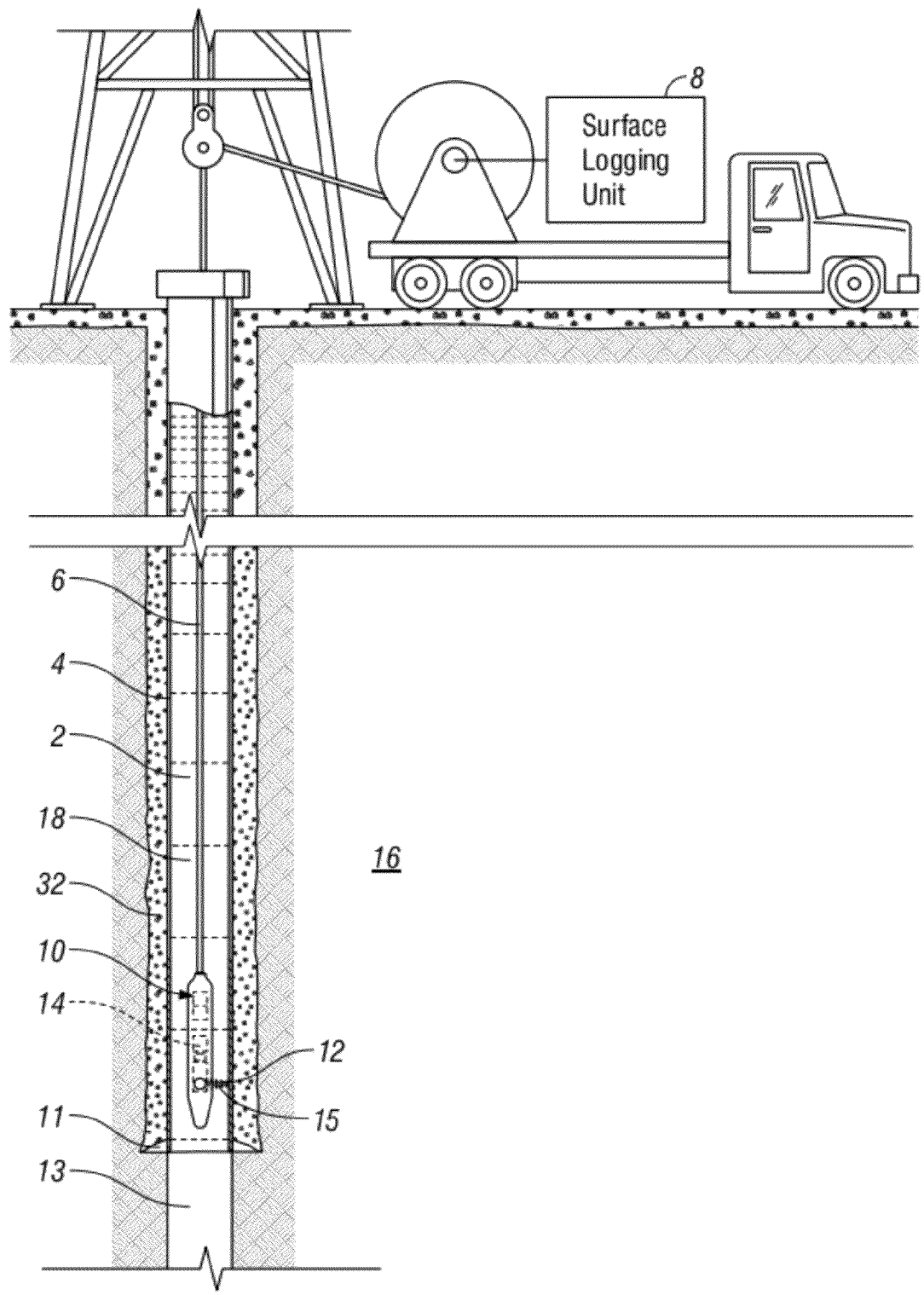
FIG. 1 depicts an exemplary acoustic pulse-echo imaging tool deployed within a borehole according to the present disclosure.

The present disclosure generally relates to servicing boreholes with electric wireline tools and Logging While Drilling (LWD) tools. In one aspect, the present disclosure relates to estimating borehole parameters, such as, but not limited to, (i) size, (ii) shape, (iii) acoustic reflection strength, (iv) acoustic contrast of borehole fluid versus the earth formation, and (v) geometry. In another aspect, the present disclosure relates to generating images of the borehole wall, including, but not limited to, at least one of: (i) a stacked image and (ii) a borehole wall image over an aperture defined by a plurality of acoustic pulses. In another aspect, the present disclosure relates to an apparatus for estimating at least one property of a borehole wall and/or an earth formation using overlapping acoustic events, wherein the events may include acoustic pulses and acoustic reflections. In some embodiments, estimates of borehole parameters and/or generated images may use data from multiple echo packets received due to reflections of multiple transmitted pulse packets in a pipelined chain sent from an acoustic transducer. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

FIG. 1 shows an exemplary acoustic pulse-echo imaging tool 10 as it is typically used in a borehole 2. The acoustic pulse-echo imaging tool 10, called the tool 10 for brevity, may be lowered to a desired depth in the borehole 2 by means of an electric wireline or cable 6 or as part of a bottomhole assembly on a rigid or non-rigid drilling tubular (not shown). Power to operate the tool 10 may be supplied by a surface logging unit 8 connected to the other end of the cable 6. Signals acquired by the tool 10 are transmitted through the cable 6 to the surface logging unit 8 for processing and presentation.

During the process of drilling the borehole 2, a casing 4 is set in the borehole 2 and cemented in place with concrete 32. At the bottom of the casing 4 is a casing shoe 11. Drilling the borehole 2 continues after cementing of the casing 4 until a desired depth is reached. At this time, the tool 10 may typically be run in an open-hole 13, which is a portion of the borehole 2 deeper than the casing shoe 11. The tool 10 is usually run in the open-hole 13 for evaluating an earth formation 16 penetrated by the borehole 2. Sometimes evaluation of the earth formation 16 proceeds to a depth shallower than the casing shoe 11, and continues into the part of the borehole 2 in which the casing 4 is cemented.

The tool 10 may include a transducer section 14 from which an acoustic pulse 12 may be emitted. The acoustic pulse 12 may travel through a fluid 18 which fills the borehole 2. The fluid 18 may include, but is not limited to, one or more of: (i) water, (ii) water-based solution of appropriate chemicals, or (iii) drilling mud. When the acoustic pulse 12 strikes the wall of the borehole 2, or the casing 4, at least part of the energy in the acoustic pulse 12 is reflected back toward the tool 10 as a reflection 15. The transducer section 14 is then switched to receive the reflection 15 of the acoustic pulse 12 from the wall of the borehole 2, or from the casing 4. The reflection 15 may contain data that are useful in evaluating one or more of: (i) the earth formation 16, (ii) the borehole 2, and (iii) the casing 4.

Figure 2:
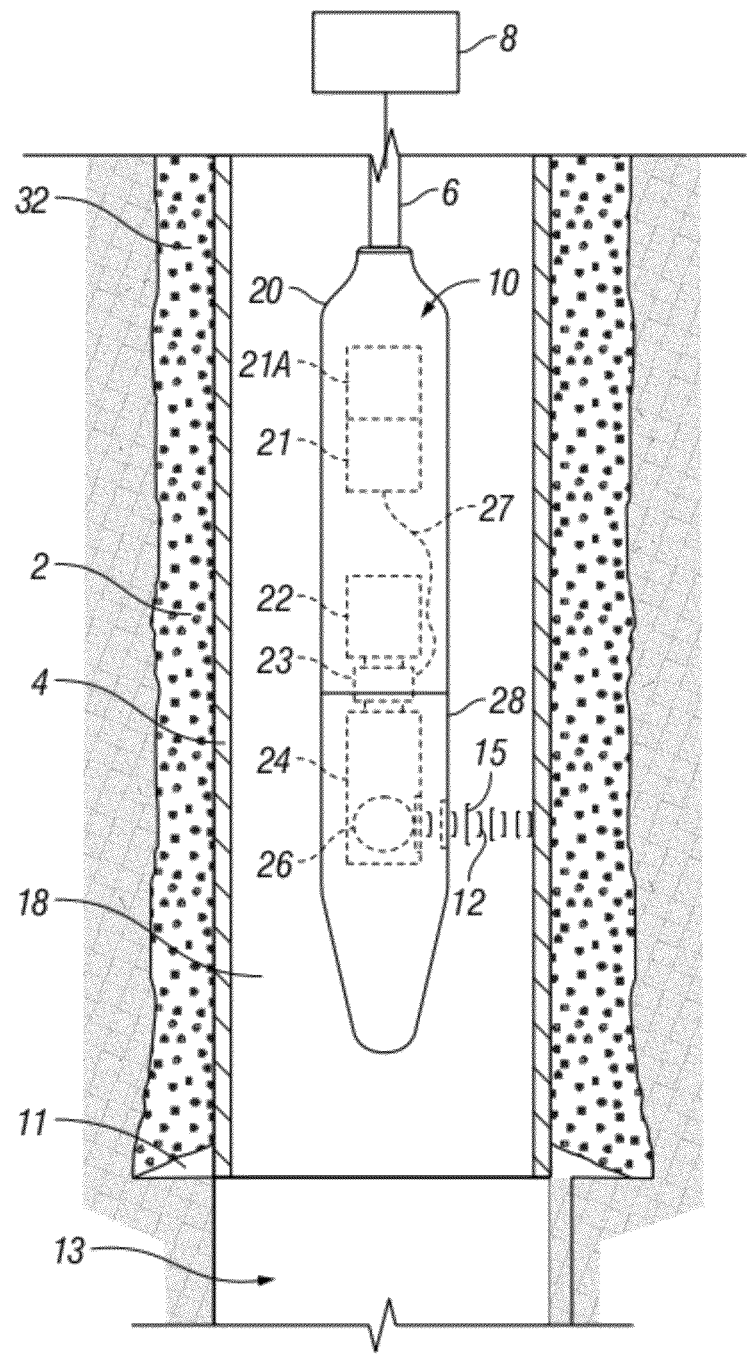
FIG. 2 shows the exemplary acoustic pulse-echo imaging tool in more detail.

FIG. 2 shows the exemplary tool 10 in more detail. The tool 10 may be connected to one end of the cable 6 and may comprise a housing 20 which contains a transducer head 24 rotated by an electric motor 22. Rotation of the transducer head 24 may enable evaluation of substantially all the circumference of the borehole 2 and/or casing 4 by enabling acoustic pulses 12 to be aimed at and reflections 15 received from various angular positions around the axis of the borehole 2 and/or casing 4. The transducer head 24 is located within an acoustically transparent cell 28. The acoustic pulses 12 and the reflections 15 can easily pass through the cell 28. The acoustic pulses 12 are generated, and the reflections 15 are received by a piezoelectric element 26 contained within the transducer head 24. The piezoelectric element 26 is constructed with an internal focusing feature so that the emitted acoustic pulses 12 have an extremely narrow beam width, typically about ⅓ of an inch. Narrow beam width enables high resolution of small features in the borehole 2. The piezoelectric element 26 may emit the acoustic pulses 12 upon being energized by electrical impulses from a transceiver circuit 21. The electrical impulses are conducted through an electromagnetic coupling 23 which enables rotation of the transducer head 24. After transmitting the acoustic pulse 12, the transceiver circuit 21 is programmed to receive a time-varying electrical voltage 27 generated by the piezoelectric element 26 as a result of the reflections 15 striking the piezoelectric element 26. The transceiver circuit 21 may also comprise an analog-to-digital converter 21A configured to convert the resulting time-varying electrical voltage 27 into a plurality of numbers, which may also be known as samples, representing the magnitude of the time-varying electrical voltage 27 sampled at spaced-apart time intervals. The plurality of numbers may be transmitted to the surface logging unit 8 through the cable 6.

Figure 3:
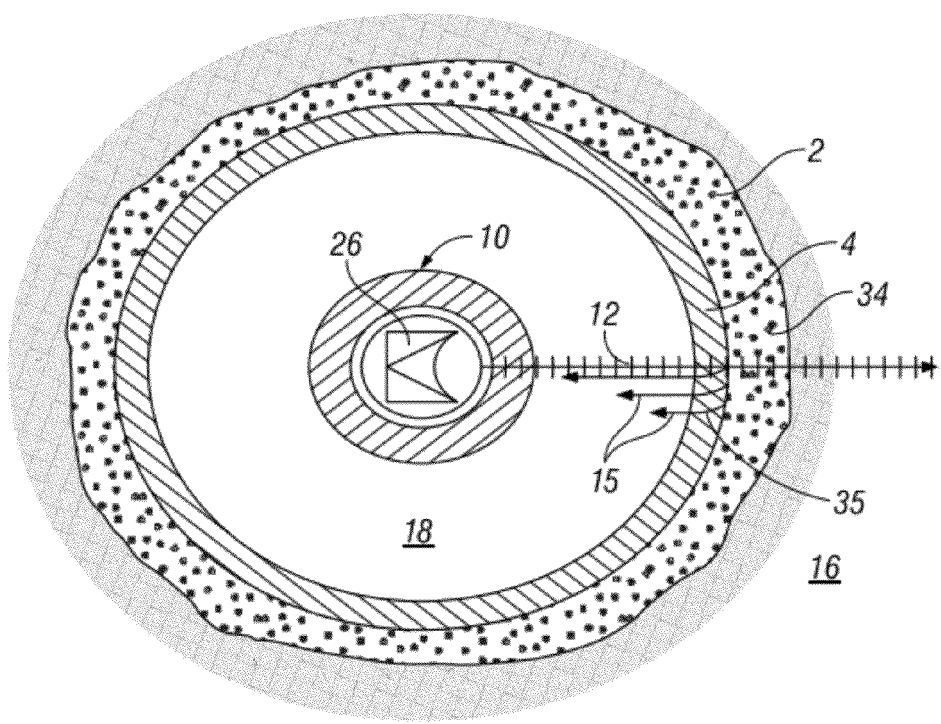
FIG. 3 shows typical acoustic energy travel paths from the exemplary tool to the borehole wall and associated reflections.

FIG. 3 shows the principle of operation of the tool 10 in more detail as it relates to determining the thickness of the casing 4. The tool 10 may be suspended substantially in the center of the borehole 2. The acoustic pulses 12 emitted by the tool 10 may travel through the fluid 18 filling the borehole 2 until the acoustic pulses 12 contact the casing 4. Because the acoustic velocity of the casing 4 and the fluid 18 are generally quite different, an acoustic impedance boundary is created at the interface between the casing 4 and the fluid 18. Some of the energy in the acoustic pulse 12 will be reflected back toward the tool 10. Some of the energy of the acoustic pulse 12 will travel through the casing 4 until it reaches the interface between the casing 4 and cement 34 in the annular space between the borehole 2 and the casing 4. The acoustic velocity of the cement 34 and the acoustic velocity of the casing 4 are generally different, so another acoustic impedance boundary is created. As at the fluid-casing interface, some of the energy of the acoustic pulse 12 may be reflected back towards the tool 10, and some of the energy travels through the cement 34. Energy reflected back towards the tool 10 from the exterior surface of the casing 4 may undergo a further partial reflection 35 when it reaches the interface between the fluid 18 in the borehole 2 and the casing 4.

Figure 4A:
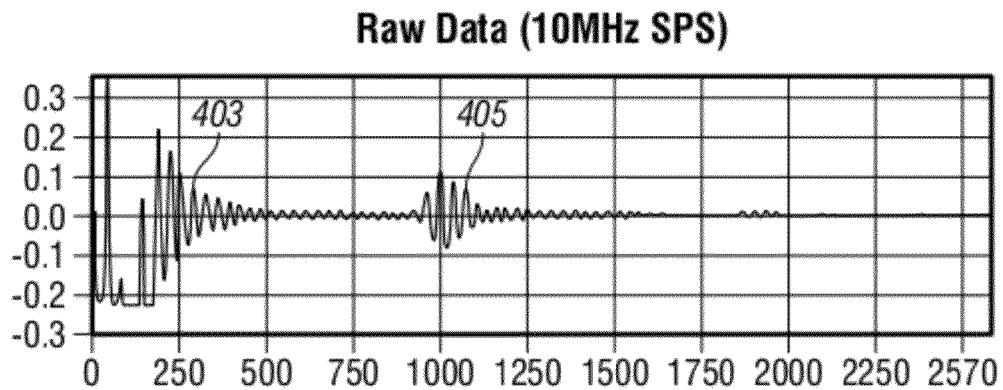
FIGS. 4(a)-(c) show three examples of a reflected signal that includes an echo signal at different times after a primary echo.
Figure 4B:
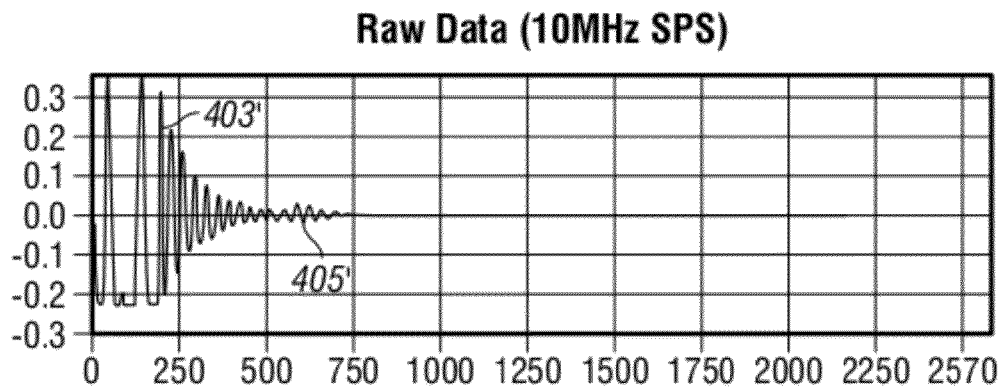
Figure 4C:
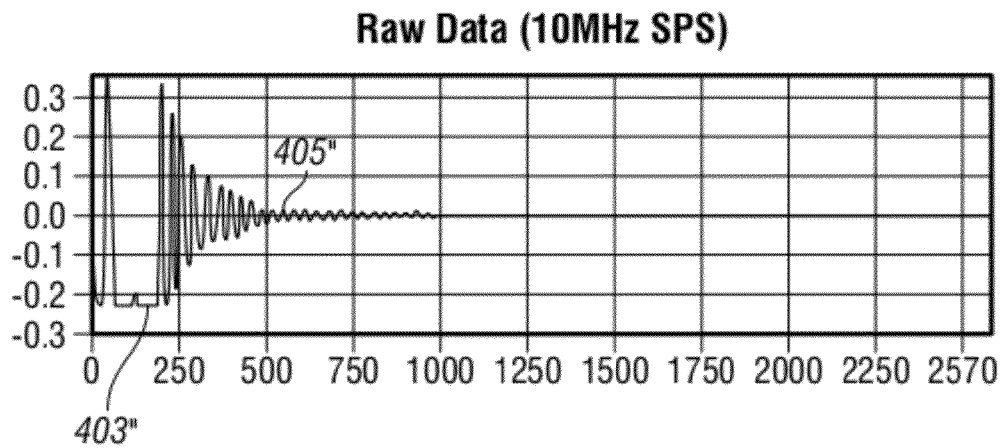

FIGS. 4(*a-c*) show three exemplary types of reflection signals 401 that may be received. FIG. 4(*a*) shows two reflections 403, 405 that are clearly separate and distinguishable. Reflection 405 may be, for example, a reflection from the casing-cement interface, while 403 may be a signal from the casing-cement interface. Other scenarios are possible, such as reflection 405 being a reflection from a void space within the cement while reflection 403 is a reverberatory signal from the inner and outer walls of the casing 4. For the purposes of the present disclosure, the reflections 405, 405' and 405" are referred to as secondary signals or echoes, while the signals 403, 403' and 403" are referred to as primary signals. The present disclosure addresses at least two problems. The first problem is that of estimating the characteristics of an echo such as 405 that has a ringing character when it is clearly separate from the primary signal. Those versed in the art and having benefit of the present disclosure will recognize that the ringing character of the secondary signal 405 results from the piezoelectric source 26 that is used to generate the signal in the tool 10. The second problem addressed in the present disclosure is that of identifying the arrival of the secondary signal when it may be separate from the primary signal, as in FIG. 4(*a*), or is not separate from the primary signal as in FIGS. 4(*b*) and 4(*c*).

One point to note about the echo signal is that it looks like a wavelet having an unknown envelope function, a known center frequency, and an approximately known bandwidth. The first problem can then be characterized as that of estimating the envelope of the wavelet, while the second problem can be characterized as that of detecting the time of arrival of the wavelet.

An effective way to estimate the envelope of a wavelet is to use the Hilbert transform. An acoustic signal f(t) such as that in FIG. 4(*a*) can be expressed in terms of a time-dependent amplitude A(t) and a time-dependent phase θ(t) as:

$$f(t) = A(t)\cos\theta(t). \quad (1)$$

Its quadrature trace f*(t) then is:

$$f^*(t) = A(t)\sin\theta(t), \quad (2)$$

and the complex trace F(t) is:

$$F(t) = f(t) + if^*(t) = A(t)e^{j\theta(t)}. \quad (3)$$

If f(t) and f*(t) are known, one can solve for A(t) as $$A(t) = [f^2(t) + f^{*2}(t)]^{1/2} = |F(t)| \quad (4)$$

as the envelope of the signal f(t).

One non-limiting example of a way to determine the quadrature trace f*(t) is by use of the Hilbert transform:

$$f^*(\tau) = p.v. \int_{-\infty}^{\infty} \frac{f(t)}{\tau - t} dt, \quad (5)$$

where p.v. represents the principal value. The Hilbert transform needs a band-limited input signal and is sensitive to wide-band noise. Consequently, before applying the Hilbert transform, a band-pass filter is applied. In the present method, a Cauchy filter is used as the band-pass filter.

Figure 5B:
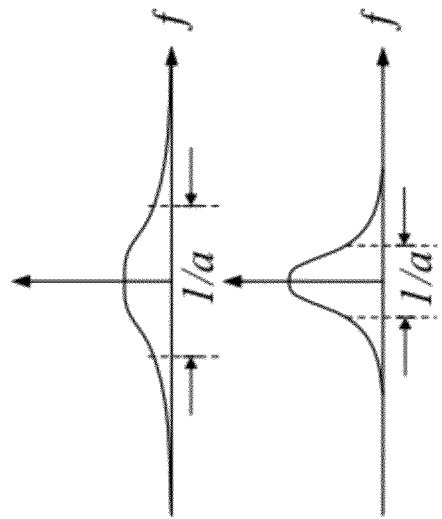
FIGS. 5(a)-(b) show time-domain and frequency-domain representations of a Cauchy bandpass filter.
Figure 5A:
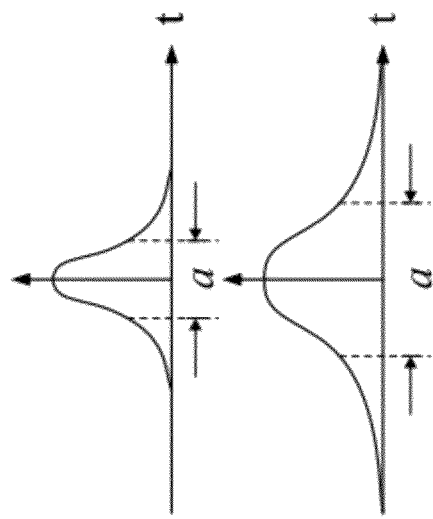

FIGS. 5(*a-b*) show representations of two different Cauchy filters in the time domain (FIG. 5(*a*)) and in the frequency domain (FIG. 5(*b*)). The Cauchy filter in the time domain is given by $$s(t) \approx \frac{1}{1 + \left(\frac{t}{a}\right)^2}. \quad (6)$$

An advantage of the Cauchy filter that can be seen in FIGS. 5(*a*), 5(*b*) is that there are no ripples in either the time domain or in the frequency domain. Visual inspection of the signal 405 gives its time interval and the number of cycles or loops in the wavelet. Knowing this and the digitization interval, the Cauchy filter can be generated.

Figure 6A:
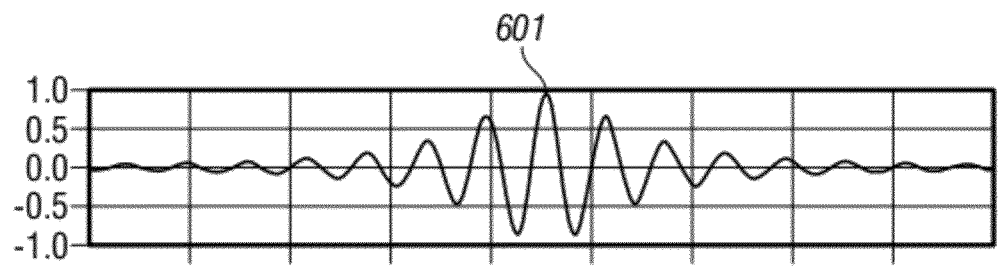
FIGS. 6(a)-(b) show the wavelet of FIG. 4(a) and the in-phase and quadrature components of its band-limited Hilbert transform.
Figure 6B:
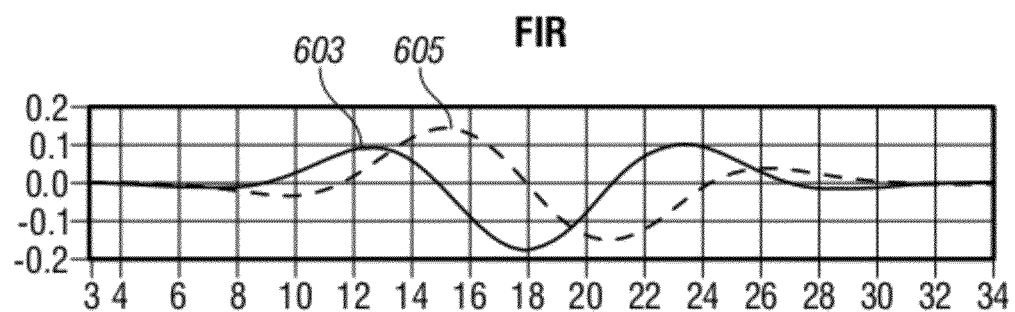

FIG. 6(*a*) shows the wavelet corresponding to signal 405 on an expanded scale. FIG. 6(*a*) shows 100 samples 601 at a sampling rate of 4 MHz and shows approximately 5 to 6 cycles of the wavelet. In some embodiments, the wavelet may be truncated to accommodate computational capabilities of the processor. As an example, the truncation may be to 36 samples. A Hanning window is used to reduce the Gibbs phenomenon that results from the truncation.

Commonly, the Hilbert transform is applied in the frequency domain. To reduce the computational burden, in one embodiment of the present disclosure the Cauchy filter is combined with the Hilbert transform and applied to the signal. To speed up the computation, the Cauchy-Hilbert band-pass filter (CHBP filter) is applied in the time domain by convolving the signal separately with the in-phase part of the CHBP filter and the quadrature component of the CHBP filter. FIG. 6(*b*) shows the in-phase 603 and the quadrature 605 components of the CHBP filter.

Figure 7:
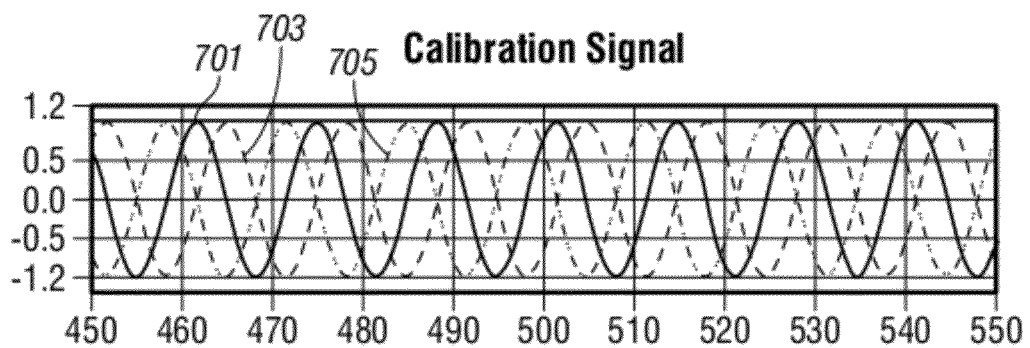
FIG. 7 shows a detail of the application of in-phase and quadrature filters to the reflection signal of FIG. 4(a)

Normalization of the gains of the filters may be necessary. This process is illustrated in FIG. 7 where 701 is the result of applying the quadrature component filter, 703 is the input signal, and 705 is the result of applying the in-phase part (actually, 180° phase). Using this process, the relative gains of the filters can be adjusted so that the amplitudes of the traces in FIG. 7 are consistent.

Figure 8A:
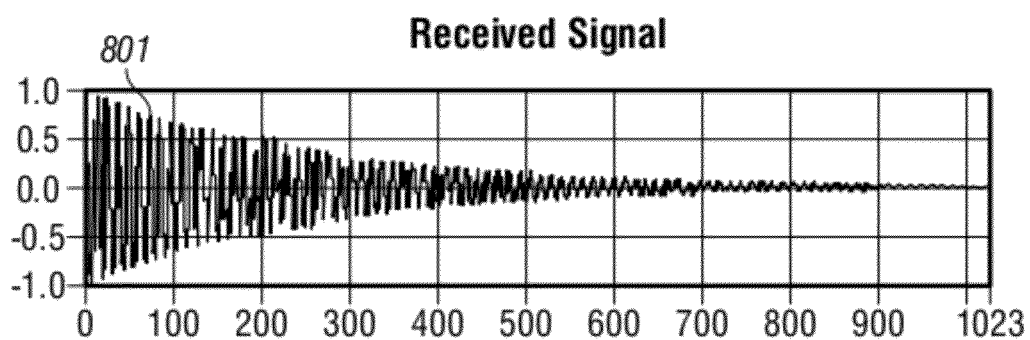
FIGS. 8(a)-(b) show the results of applying the envelope detection method to the signal of FIG. 4(c)
Figure 8B:
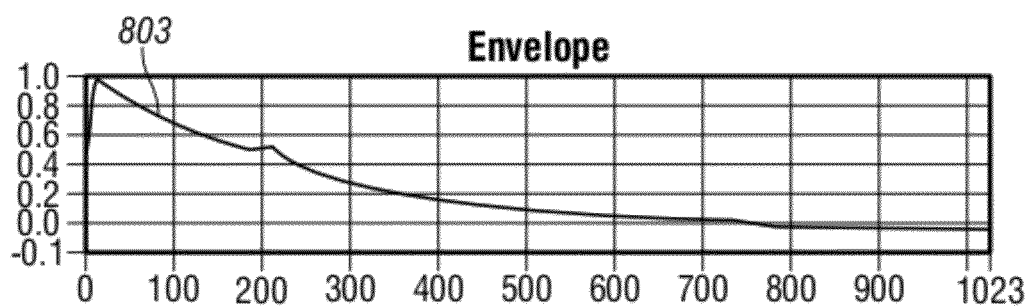

The envelope of the signal in FIG. 4(*c*) may be determined using the filters derived above based on the wavelet 801 in FIG. 8(*a*). The result is shown in FIG. 8(*b*) by 803. Those versed in the art and having benefit of the present disclosure will recognize that the envelope curve has some high frequency noise. This noise is a result of improper suppression of the Gibbs phenomenon by the Hanning window. While a small perturbation of the curve 803 is visible at t=200 corresponding to an echo, the perturbation is not a local maximum, so that a peak finding method would not detect this echo. Accordingly, in one embodiment of the disclosure, the first and second moments are removed from the envelope curve using a Laplace Operator. The Laplace operator may be denoted by:

$$\nabla^2 = \frac{d^2}{dt^2}. \quad (7)$$

This filter is very sensitive to high frequency noise, so that a low pass filtering may be applied prior to the Laplace operator. In one embodiment of the disclosure, a Gaussian filter is used, so that the combination of the Gaussian-Laplace operator may be denoted by:

$$\nabla^2 \cdot g(t) = \frac{d^2}{dt^2} e^{-\left(\frac{t}{\tau}\right)^2}. \tag{8}$$

Figure 9A:
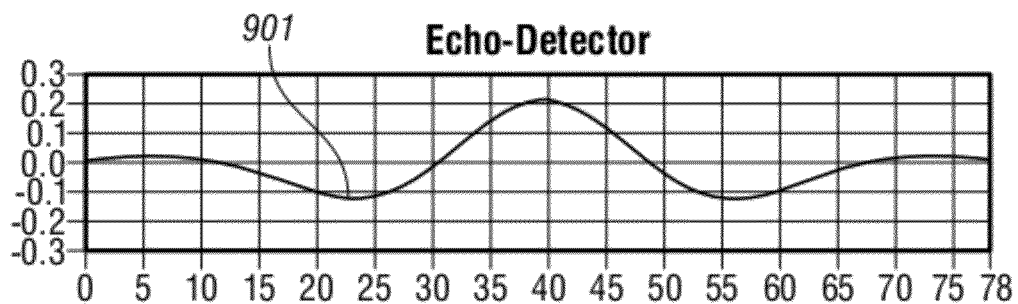
FIGS. 9(a)-(b) show an echo detector and the application of it to the data in FIG. 8.
Figure 9B:
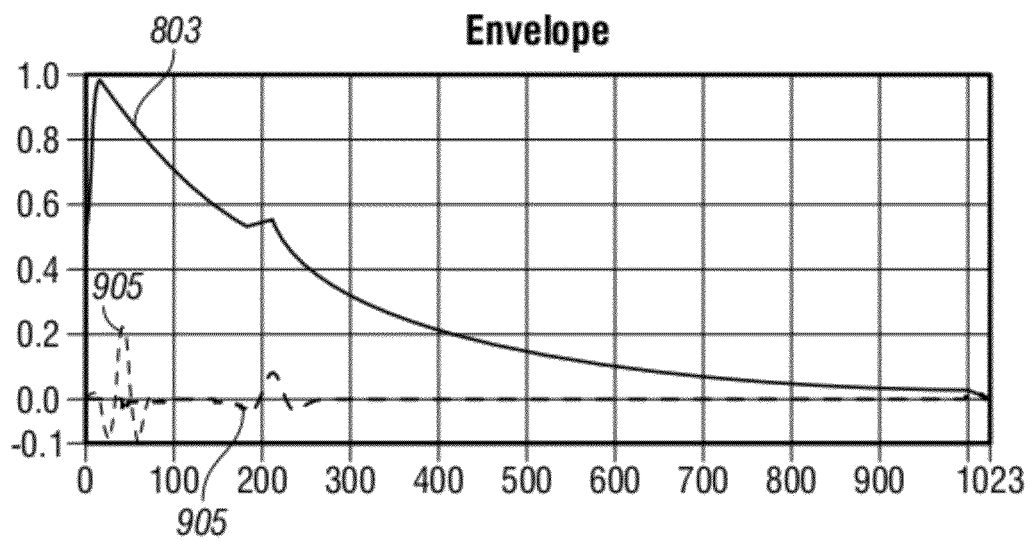

In the example, the wavelet energy packet contains about 5 to 6 cycles (6 cycles with 100 samples for this case). A symmetric filter is needed to preserve phase information. In one embodiment, the filter length is chosen to have 5 cycles with 79 samples. Again a Hanning window function is added on the Gaussian Filter to reduce the Gibbs phenomenon. The result of applying the Gauss-Laplace operator 901 to the data in 803 is shown in FIG. 9(b) as echoes 905. Two echoes can be clearly seen. The times of the two echoes give the reflection times.

Figure 10:
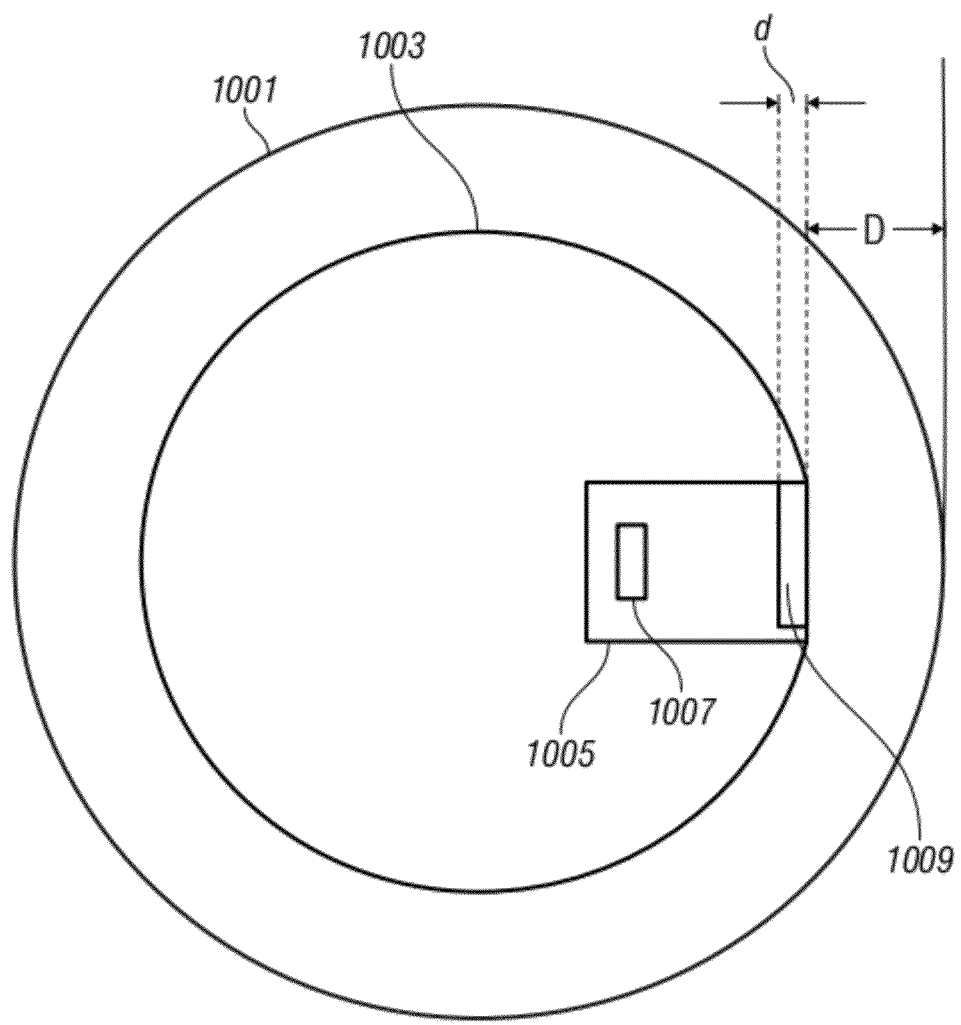
FIG. 10 shows a tool suitable for MWD applications for imaging a borehole wall.

The disclosure above has been for a specific wireline tool used for imaging of borehole walls and for analysis of the quality of cement bond. The principles outlined above may also be used for MWD applications for imaging of borehole walls. Disclosed in FIG. 10 is a cross-section of an acoustic sub that can be used for determining the formation density is illustrated. The drill collar is denoted by 1003 and the borehole wall by 1001, and they are separated by a distance D. An acoustic transducer 1007 is positioned inside a cavity 1005. One end of the cavity has a metal plate 1009 with known thickness d, compressional wave velocity and density. The cavity is filled with a fluid with known density and compressional wave velocity. Acoustic pulses generated by the transducer 1007 and reflected by the borehole wall 1001 are the desired echo, and reflections from the plate 1009 interfere with the detection of the desired echo. This particular configuration is illustrated in U.S. patent application Ser. No. 11/447,780 of Chemali et al., having the same assignee as the present disclosure and the contents of which are incorporated herein by reference. The transducer of Chemali can be replaced by an array (or a phased array) of transducers as described above.

The problem of interfering signals is also encountered in U.S. Pat. No. 7,311,143 to Engels et al., having the same assignee as the present disclosure and the contents of which are incorporated herein by reference. Engels discloses a method of and an apparatus for inducing and measuring shear waves within a wellbore casing to facilitate analysis of wellbore casing, cement and formation bonding. An acoustic transducer 1007 is provided that is magnetically coupled to the wellbore casing and is comprised of a magnet combined with a coil, where the coil is attached to an electrical current. The acoustic transducer 1007 is capable of producing and receiving various waveforms, including compressional waves, shear waves, Rayleigh waves, and Lamb waves as the tool traverses portions of the wellbore casing. The different types of waves travel at different velocities and may thus interfere with each other. In Engels, the received signals may not be echoes, and may simply be different modes propagating at different velocities in the casing in axial and/or circumferential directions. For the purposes of the present disclosure, the term "arrival" is used to include both echoes and signals propagating in the casing.

Figure 11:
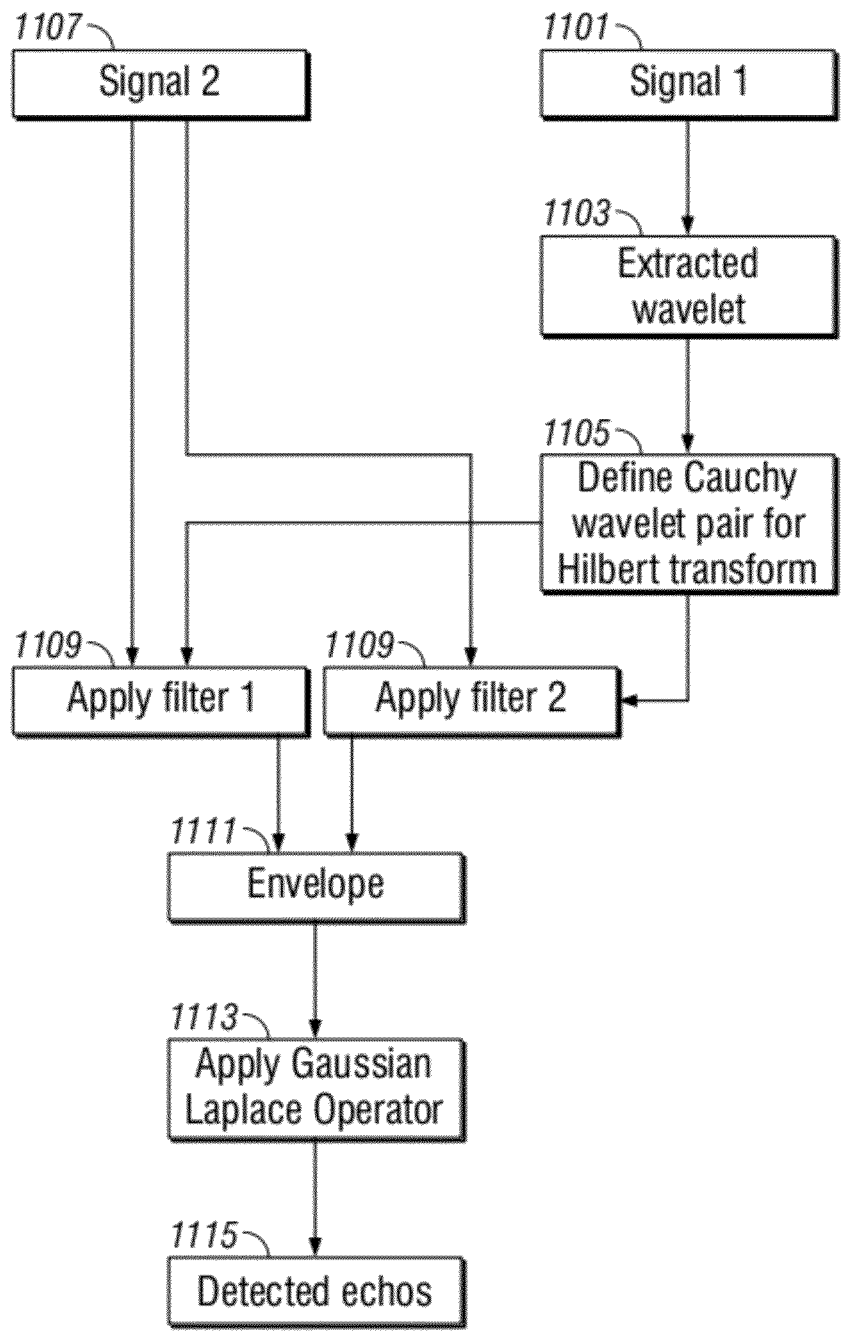
FIG. 11 is a flow chart illustrating some of the steps of a method of one embodiment according to the present disclosure.

FIG. 11 is a flow chart that summarizes an exemplary method of one embodiment according to the present disclosure. Starting with a first signal 1101 in which an arrival is clearly identifiable, a wavelet 1103 is extracted. Based on the characteristics of the wavelet, Cauchy wavelet pairs for the Hilbert transform are defined 1105. The Cauchy wavelet pairs are applied 1109 to a second signal 1107 in which the arrivals are not clearly identifiable, and an envelope is estimated 1111 for the second signal. A Gauss-Laplace operator is applied 1113 to the envelope and individual arrivals are detected 1115.

Based on travel-times and amplitudes of the detected arrivals, using known methods, it is then possible to determine one or more of the following: (i) a thickness of the casing, (ii) the acoustic impedance of the cement in proximity to the casing, (iii) a position and size of a void in the cement, and (iv) a position and size of a defect in the casing.

Figure 12:
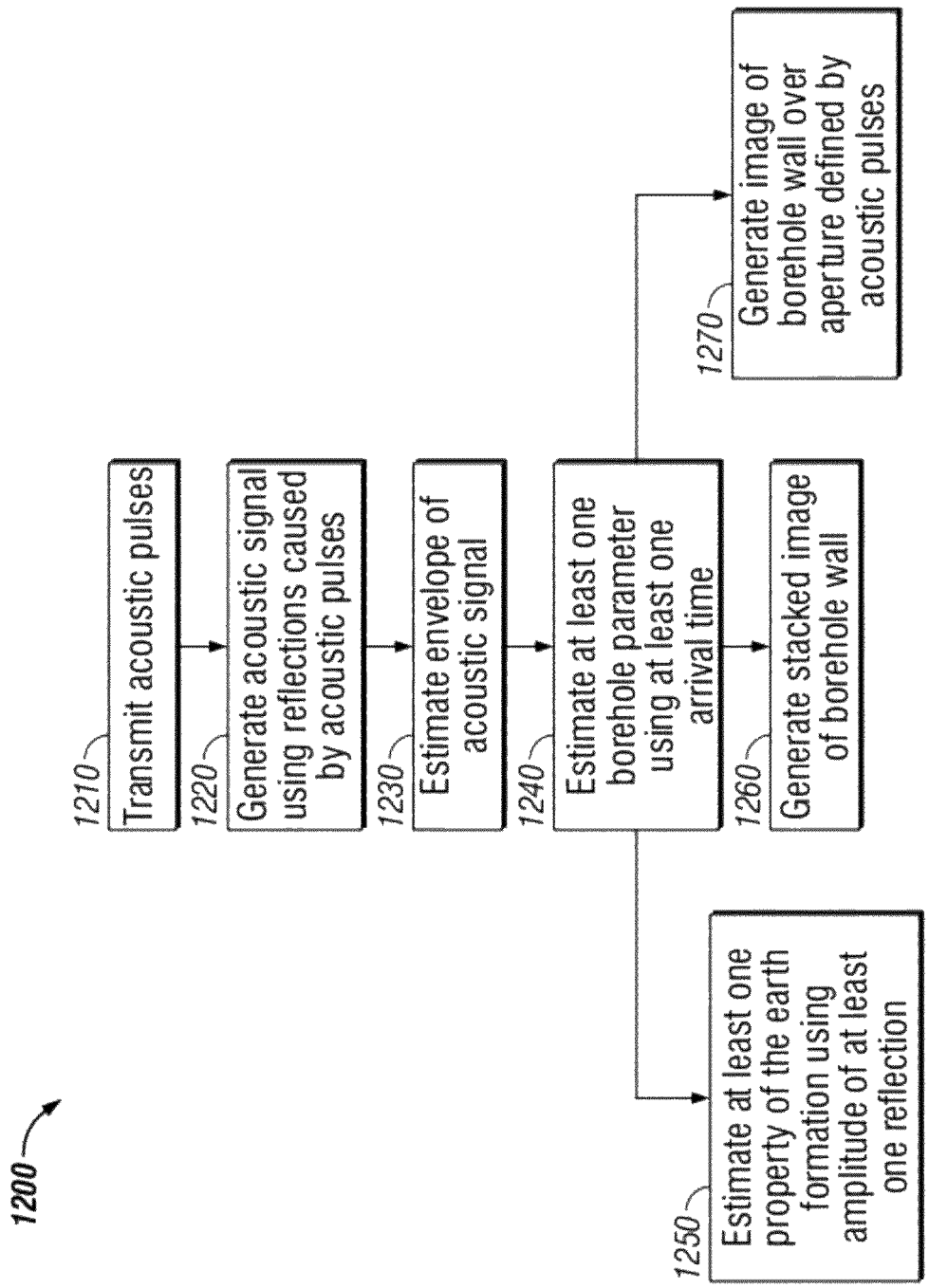
FIG. 12 is a flow chart illustrating some of the steps of a method of another embodiment according to the present disclosure.

FIG. 12 is a flow chart that summarizes an exemplary method 1200 of another embodiment according to the present disclosure. In step 1210, a plurality of acoustic pulses is transmitted by transducer 1007 (FIG. 10). In step 1220, an acoustic signal is generated by the transducer 1007 in response to receiving a plurality of reflections caused the plurality of acoustic pulses. In step 1230, an envelope of the acoustic signal may be estimated by at least one processor. In step 1240, at least one parameter of the borehole may be estimated using at least one arrival time of the acoustic signal envelope. In step 1250, a property of the earth formation may be estimated using the amplitude of at least one of the reflections. In step 1260, a stacked image of the borehole wall may be generated using the plurality of reflections. In step 1270, an image of the borehole wall over an aperture defined by the plurality of acoustic pulses may be generated using the plurality of reflections. In some embodiments, one or more of steps 1250, 1260, and 1270 may be performed. The plurality of acoustic pulses may be close enough together in time that the reflections of the pulses may overlap when returning to the transducer (or an array of transducers). In some embodiments, the plurality of acoustic pulses may be spaced such that reflections from acoustic pulses at the beginning of the plurality of acoustic pulses may be arriving before the transmission of the plurality of acoustic pulses has finished, thus, step 1220 may begin before step 1210 has been completed. Borehole parameters estimated may include, but are not limited to, one of: (i) size, (ii) shape, (iii) acoustic reflection strength, (iv) acoustic contrast of borehole fluid versus the earth formation, and (v) geometry. The acoustic signal may be filtered before or during processing.

Figure 13:
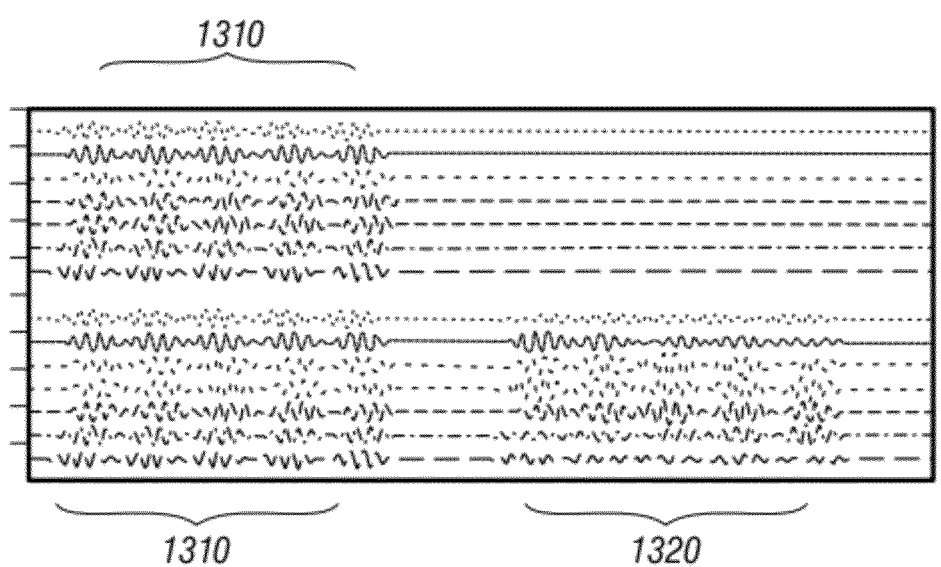
FIG. 13 graphically shows acoustic pulses and their corresponding reflections generated using an apparatus according to one embodiment of the present disclosure.

FIG. 13 is a graph of the acoustic pulses and their reflections due to the pipelined pulses received by a phased array. Five acoustic pulses 1310 are shown, followed by their associated echoes 1320.

As would be known to those versed in the art and having benefit of the present disclosure, the amplitude of the events depends upon the acoustic impedance contrast between the fluid in the borehole and the earth formation. Accordingly, an image of the amplitudes of the events provides an indication of the acoustic impedance of the borehole wall. As the borehole fluid properties are relatively invariant over many meters or tens of meters of the depth of the borehole, the image of the amplitudes is also indicative of the velocity of the earth formation.

When measurements are made in an MWD mode, the rotational speed of the transducer is the same as the rotational speed of the drill collar. Accordingly, a principal benefit of the method disclosed above is in improving the signal to noise ratio of the images of the borehole wall. The travel time measurements may be used to estimate the location of the BHA in the borehole and the geometry of the borehole using the method disclosed in U.S. Pat. No. 7,548,817 to Hassan et al., having the same assignee as the present disclosure and the contents of which are incorporated herein by reference. As discussed in Hassan, a piecewise elliptical fit is made to the travel time measurements. This basically involves a transformation of the travel time measurements (which are in a tool-centered polar coordinate system) to a fixed Cartesian coordinate system.

Figure 14:
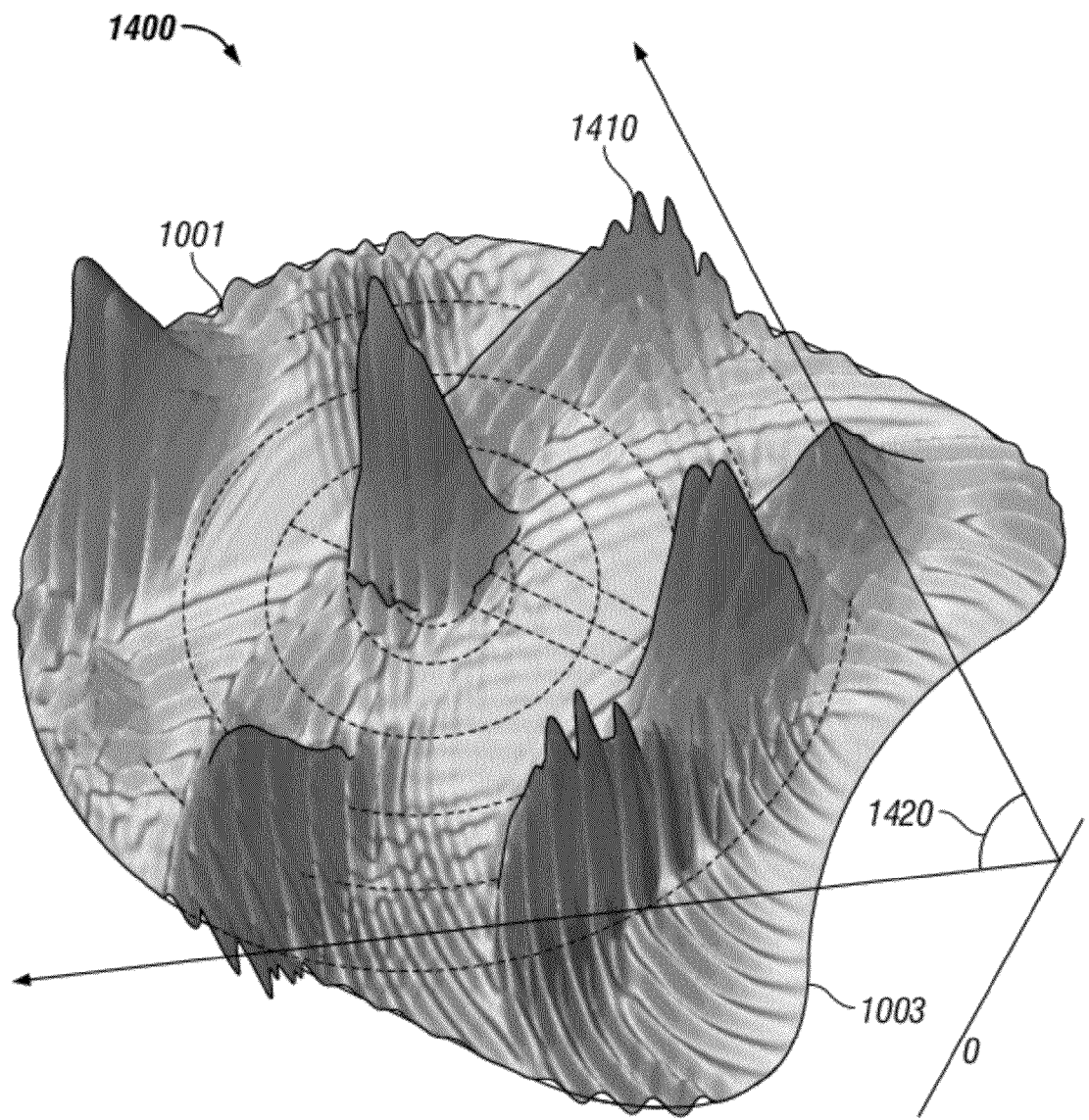
FIG. 14 graphically shows sound pressure generated by a phased array according to one embodiment of the present disclosure.

FIG. 14 is a graph that shows an exemplary image of sound pressure 1400 generated by a phased array with three pulse packets. Here, the pulse packets target different locations on the borehole surface 1001, thus a wide angle 1420 is formed by the pulses. The pulses extend from the drill collar 1003 to the borehole wall 1001. Peaks 1410 may be generated due to pulses, pulse reflections, or combinations thereof. Unfocused pulses or wide angle distribution of pulses may be used to broaden azimuthal coverage and reduce logging times.

Figure 15:
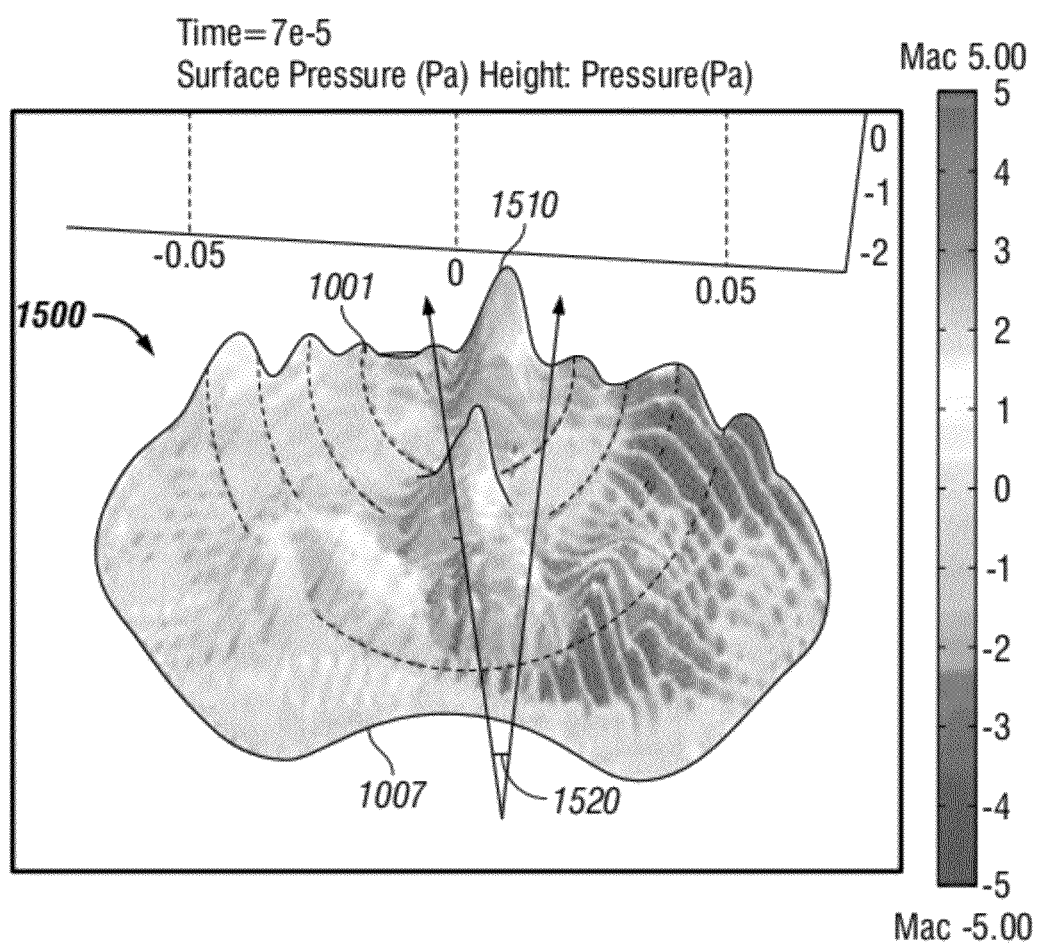
FIG. 15 graphically shows sound pressure generated by a phased array with focusing according to one embodiment of the present disclosure.

FIG. 15 is a graph that shows an exemplary image of sound pressure 1500 generated by a phased array when five pulse packets are focused to target the same location on the borehole surface 1001. Here, the pulse packets are focused, resulting in a narrow angle 1520 as the pulses extend from the drill collar 1003 to the borehole wall 1001. Peaks 1510 may be generated due to pulses, pulse reflections, or combinations thereof. Focused pulses may be used to improve the signal to noise ratio.

Figure 16:
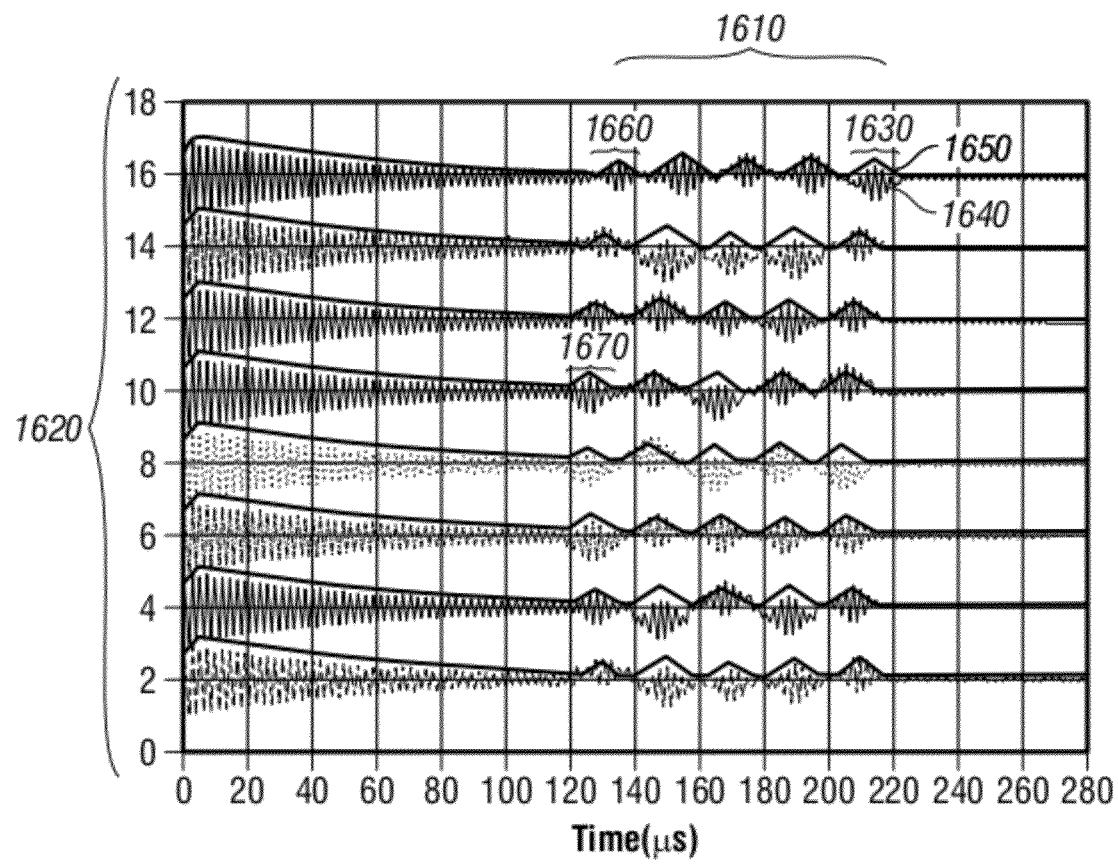
FIG. 16 graphically shows acoustic reflections with estimated envelopes according to one embodiment of the present disclosure.

FIG. 16 shows exemplary signals caused by reflections 1610 received by eight transducers 1620. Each transducer is pulsed with a sequence of five pulses. For each acoustic reflection 1630, the signal 1640 has an estimated envelope 1650. When the acoustic pulses are steered or focused, their respective reflections 1630 may return at different times. This may be seen when comparing the leading reflection 1660 of an outer transducer and the leading reflection 1670 of an inner transducer. The difference in travel distance may result in a longer travel time for a reflection returning to an outer transducer than an inner transducer. Here the term outer transducer refers to a transducer with a longer travel path from a particular focal point than an inner transducer. In FIG. 16, the outermost tracks (2 and 16 along x-axis) represent outer transducers and travel path length decreases moving inward toward tracks 8 and 10. Further processing comprises stacking of the individual envelopes 1650 using the same beam steering that is used to activate the individual transducers.

Figure 17:
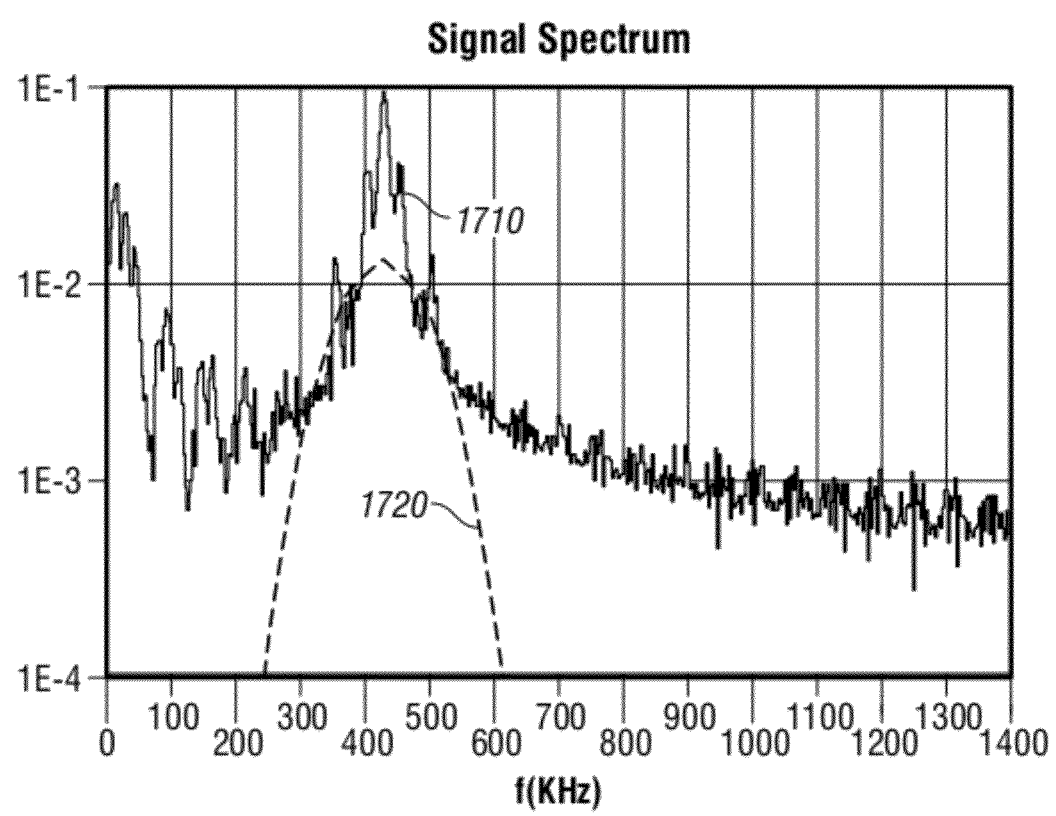
FIG. 17 graphically shows the spectral and wavelet impulse of the acoustic reflections by amplitude and frequency.

FIG. 17 shows a stacked reflection in spectral form 1710 with a wavelet 1720 indicating the general contours of signal amplitude across a frequency range.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation properties may be recorded on a suitable medium and used for subsequent processing upon retrieval of the BHA. The determined formation properties may further be telemetered uphole for display and analysis.

While the foregoing disclosure is directed to the one mode embodiments of the disclosure, various modifications will be apparent to those skilled in the art. It is intended that all variations be embraced by the foregoing disclosure.

We claim:

1. An apparatus configured to estimate a geometry of a borehole penetrating an earth formation, the apparatus comprising:
a rotatable transducer assembly;
an array of transducers on the rotatable transducer assembly, at least one element of the array configured to:
generate a sequence of pulses in the borehole, at least one of the sequence of pulses is generated such that reflections from the at least one sequence of pulses overlap with reflections from at least one other of the sequence of pulses, and
receive an acoustic signal comprising a plurality of overlapping events resulting from the generation of the sequence of pulses; and
at least one processor configured to:
estimate an envelope of the received acoustic signal at the at least one element of the array of transducers; and
estimate at least one arrival time of at least one of the plurality of overlapping events from the envelope of the received acoustic signals, the at least one arrival time being characteristic of the geometry of the borehole.

2. The apparatus of claim 1, wherein the at least one processor is further configured to:
estimate a property of the earth formation using an amplitude of at least one of the plurality of overlapping events.

3. The apparatus of claim 1, wherein the at least one processor is further configured to:
generate a stacked image of a wall of the borehole, wherein the plurality of overlapping events comprises a plurality of reflections.

4. The apparatus of claim 1, wherein the at least one processor is further configured to:
generate an image of a wall of the borehole over an aperture defined by the sequence of pulses.

5. The apparatus of claim 1, wherein the at least one processor is further configured to:
estimate the location of the rotatable transducer assembly within the borehole.

6. The apparatus of claim 1, wherein the rotatable transducer assembly is configured to be conveyed into the borehole on one of: (i) a wireline and (ii) a bottomhole assembly on a drilling tubular.

7. The apparatus of claim 1, wherein the at least one element of the array further comprises a plurality of elements, and wherein the at least one processor is further configured to combine the envelope of corresponding events associated with each of the elements of the array using a beam steering.

8. A method for estimating a geometry of a borehole penetrating an earth formation, comprising:
estimating, using at least one processor, an envelope of an acoustic signal received by at least one element of an array of transducers, the acoustic signal comprising a plurality of overlapping events resulting from a sequence of pulses, at least one of the sequence of pulses is generated such that reflections from the at least one sequence of pulses overlap with reflections from at least one other of the sequence of pulses; and
estimating the geometry of the borehole using at least one arrival time of at least one of the plurality of overlapping events from the envelope of the received acoustic signal.

9. The method of claim 8, further comprising:
receiving the acoustic signal.

10. The method of claim 8, further comprising:
estimating a property of the earth formation using an amplitude of at least one of the plurality of overlapping events.

11. The method of claim 8, wherein the plurality of overlapping events comprises a plurality of reflections.

12. The method of claim 11, further comprising:
generating a stacked image of a wall of the borehole using the plurality of reflections.

13. The method of claim 11, further comprising:
generating an image of a wall of the borehole over an aperture defined by the sequence of pulses using the plurality of reflections.

14. The method of claim 8, further comprising:
generating the plurality of acoustic pulses in the borehole.

15. The method of claim 14, using, to generate the plurality of acoustic pulses, at least one element of an array of transducers on a rotatable transducer assembly.

16. The method of claim 15, further comprising:
estimating the location of the rotatable assembly within the borehole.

17. The method of claim 15, further comprising:
conveying the rotatable transducer assembly into the borehole on one of: (i) a wireline and (ii) a bottomhole assembly on a drilling tubular.

18. The method of claim 8 further comprising:
estimating an envelope of an acoustic signal received by each element of the array and combining the estimated envelopes using a beam-steering.

19. A non-transitory computer-readable medium product having stored thereon instructions that, when executed by at least one processor, perform a method, the method comprising:
estimating an envelope of an acoustic signal received by at least one element of an array of transducers, the acoustic signal comprising a plurality of overlapping events resulting from a sequence of pulses, at least one of the sequence of pulses is generated such that reflections from the at least one sequence of pulses overlap with reflections from at least one other of the sequence of pulses; and
estimating a geometry of a borehole using at least one arrival time of at least one of the plurality of overlapping events from the envelope of the received acoustic signal.

20. The non-transitory computer-readable medium product of claim 19 further comprising at least one of: (i) a ROM, (ii) an EPROM, (iii) an EEPROM, (iv) a flash memory, and (v) an optical disk.

* * * * *